Aug. 22, 1944.    L. M. CALDWELL    2,356,147
SELF-EQUALIZING SLING
Filed March 11, 1943    3 Sheets-Sheet 1
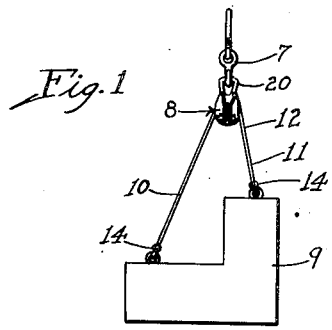
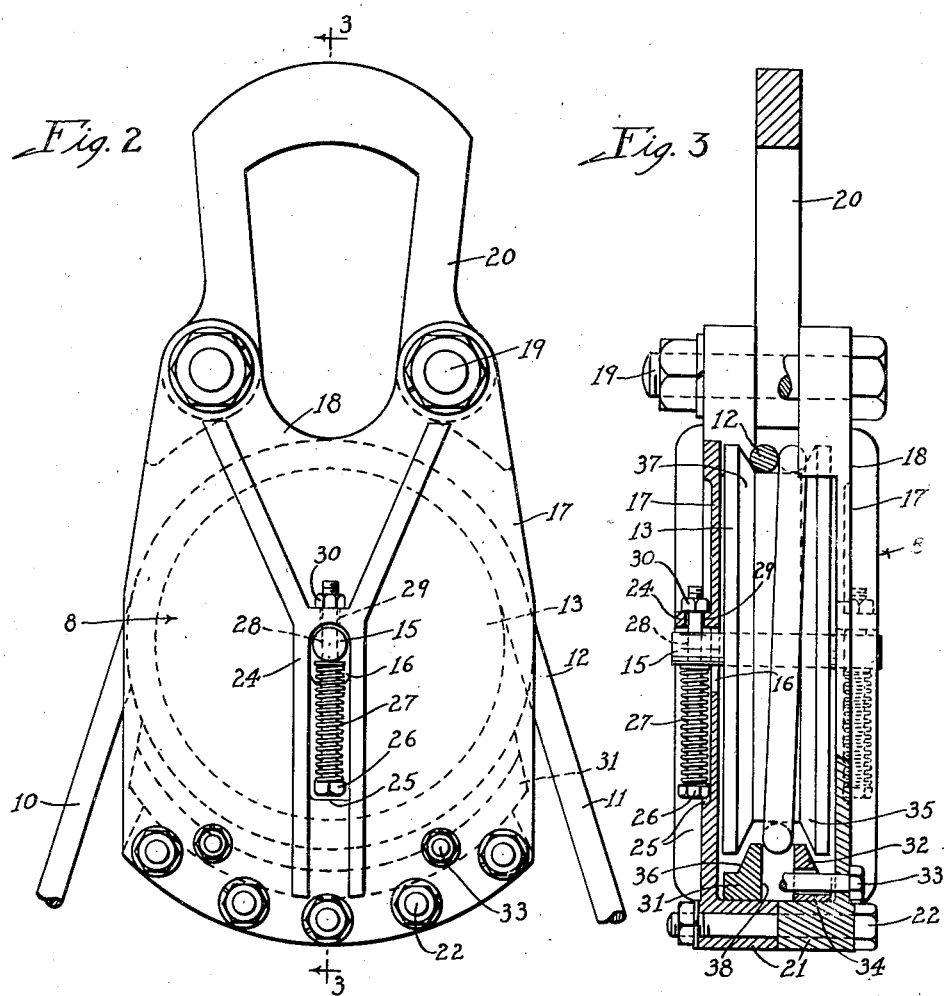
Inventor:
Leslie M. Caldwell
By
McCanna, Wintercorn & Morsbach Attys.

Aug. 22, 1944.  L. M. CALDWELL  2,356,147
SELF-EQUALIZING SLING
Filed March 11, 1943  3 Sheets-Sheet 2
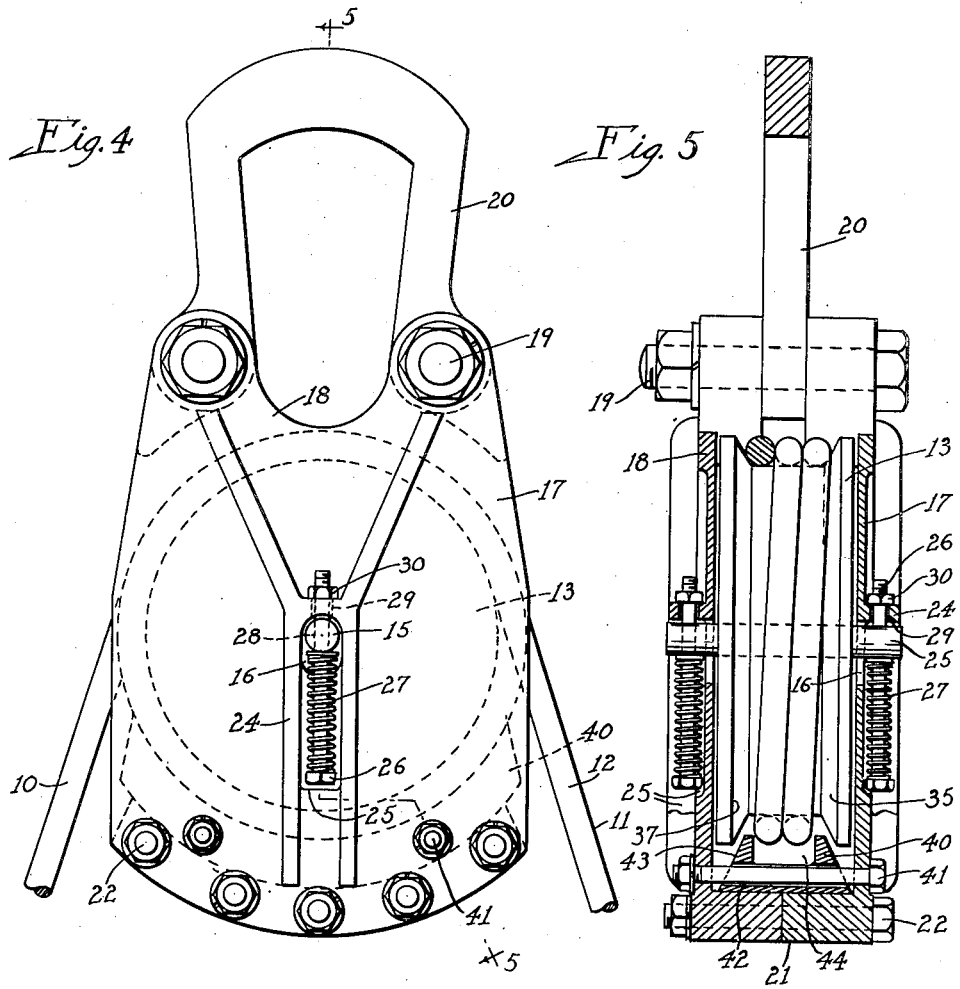
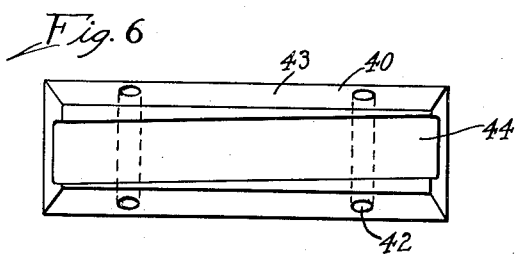
Inventor:
Leslie M. Caldwell
By
McCanna, Wintercorn & Morsbach
Attys.

Aug. 22, 1944.  L. M. CALDWELL  2,356,147
SELF-EQUALIZING SLING
Filed March 11, 1943  3 Sheets-Sheet 3
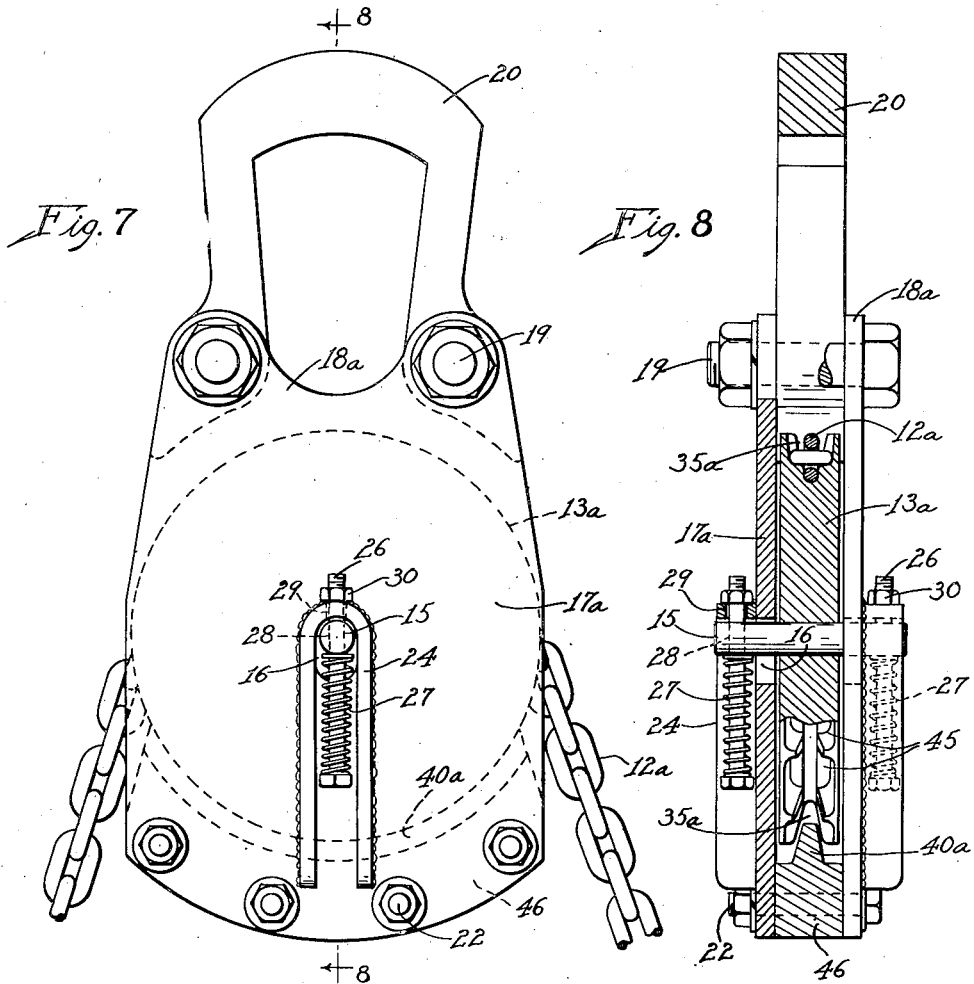

Patented Aug. 22, 1944

2,356,147

UNITED STATES PATENT OFFICE 2,356,147

SELF-EQUALIZING SLING

Leslie M. Caldwell, Rockford, Ill.

Application March 11, 1943, Serial No. 478,803

21 Claims. (Cl. 294—1)

This invention relates to slings for use with hoisting equipment generally, and is more particularly concerned with a sling which is self-equalizing and automatically locks to prevent a change in the length of the legs of the sling when the load is lifted.

A salient feature of the sling of my invention is the yieldable mounting of the pulley wheel in the frame so that the pulley is free to turn for equalization of the sling, but yields under load and assumes a locked position so that the rope, which has previously adjusted itself, cannot shift its position any further and will accordingly hoist the load without danger of tipping.

In one form of my invention a single brake shoe is arranged to be engaged by the pulley wheel when depressed under load, whereby frictionally to resist turning of the wheel so long as the same continues to be under load, and in another form two shoes are guided for movement in the frame toward one another so as to grip a pass of the rope therebetween and also engage the pulley wheel to frictionally resist turning thereof so long as the same is under load.

The invention is illustrated in the accompanying drawings, in which—

Fig. 1 is a side view on a small scale illustrating a sling made in accordance with my invention in operation;

Fig. 2 is a side view of the frame indicating the pulley wheel and brake shoes in dotted lines;

Fig. 3 is a view partly in vertical section on the line 3—3 of Fig. 2 and partly in front elevation;

Fig. 4 is a view similar to Fig. 2 showing another form of the invention;

Fig. 5 is a section on the line 5—5 of Fig. 4;

Fig. 6 is a view of the brake shoe removed from the frame;

Fig. 7 is a view similar to Fig. 2 showing still another form of the invention, and Fig. 8 is a section on the line 8—8 of Fig. 7.

Similar reference numerals are applied to corresponding parts throughout these views.

Referring first to Figs. 1 to 3, the reference numeral 7 designates a crane hook in connection with which the sling of my invention, designated generally by the reference numeral 8, is used for lifting and carrying a load, indicated diagrammatically at 9. The sling comprises two legs 10 and 11 formed from a single length of wire rope 12, which intermediate its ends extends around a pulley wheel 13 about a turn and a half, as illustrated in Figs. 2 and 3, and is arranged to be detachably connected at the ends of the legs 10 and 11 to the load in any suitable or preferred manner, as, for example, by means of hooks 14 secured on the ends of the rope. The wheel 13 is rotatably mounted on an axle 15, the opposite ends of which extend through holes 16 in the face plates 17 forming the wheel supporting frame 18. The plates 17 are in substantially parallel spaced relation and at their upper ends are connected by means of bolts 19 with an eye-piece 20 that is adapted to receive the crane hook 7. The plates 17 have arcuate flanges 21 on their lower ends, and bolts 22 extend through registering holes in the lower portions of said plates to fasten the same together with the flanges in abutting relation. Vertically extending bosses 24 are cast integral with the face plates 17 and are recessed lengthwise, as indicated at 25, to accommodate hanger bolts 26 on which coiled compression springs 27 are carried for the spring cushioned mounting of the axle 15. The bolts 26 extend upwardly through the springs 27 and through holes 28 provided therefor in the opposite ends of the axle 15 and through holes 29 provided therefor in the upper end portion of the bosses 24, nuts 30 being threaded on the projecting upper ends of the bolts to fasten the same in place and also provide a convenient means of adjusting the compression of the springs 27, to suit requirements. The holes 16 are elongated vertically so that the axle 15 has room for downward movement with the pulley wheel 13 under a load sufficient to compress the springs 27 regardless of what the degree of preloading of these springs may be. Ordinarily the load on the pulley wheel 13 required to deflect the springs 27 is only a small fraction of the weight of the things to be hoisted, and, on the other hand, is far enough beyond the weight of the rope 12 and pulley wheel so that there will be no perceptible deflection of the springs in the equalization of the sling. In that way the pulley wheel is free to turn so that the sling can equalize itself before there is any downward movement of the wheel toward a locked position.

Two arcuate brake shoes 31 and 32 are loosely mounted in the lower portion of the frame 18 on through-bolts 33, the shoes having holes 34 through which the bolts 33 extend freely. The groove 35 in the pulley wheel is flared and a complementary taper 36 is provided on the outer side faces of the brake shoes 31 and 32, so that when the pulley wheel moves downwardly into engagement with the shoes, the inclined faces 36 have surface to surface frictional engagement with the inclined sides 37 of the pulley wheel groove and the shoes will frictionally resist turning of the wheel. The inner side faces 38 of the brake shoes 31 and 32 are flat and in substantially parallel relation to one another, and are arranged to be brought into contact with that portion of the rope 12 extending around the lower portion of the pulley wheel between the shoes. In the engagement of the pulley wheel with the shoes, the shoes are forced toward one another with a cam action, by the sliding engagement of the inclined sides 37 of the pulley groove with the inclined side faces 36 on the shoes, and in that way the rope 12 is gripped frictionally and held against slipping with respect to the pulley wheel when the wheel is held against turning. I may provide spring means for normally urging the brake shoes apart, whereby to insure quick release of the rope by the shoes when the load on the pulley wheel is released and the pulley wheel is moved upwardly away from the shoes under the action of the springs 27.

The operation should be clear from the foregoing description. Assuming that the cable 12 has been attached to the casting or other load 9 to be lifted, the operator should exercise reasonable care in locating the crane hook 7 approximately in vertical alignment with the center of gravity of the load, so that the legs of the sling will properly adjust themselves relative to the load. In the initial elevation of the crane hook, the sling equalizes itself, the pulley wheel 13 turning in this equalization, then when the rope 12 is taut and the crane hook is elevated still further, the load imposed upon the pulley wheel 13 becomes enough to overcome the resistance of the springs 27 and the pulley wheel moves downwardly relative to the frame 18 into engagement with the brake shoes 31 and 32. The wedging engagement of the brake shoes in the groove 35 of the wheel causes the sliding of the shoes inwardly toward one another enough to frictionally grip the pass of rope therebetween. In that way the wheel 13 is frictionally held against turning and the rope 12 is frictionally held against slipping with respect to the wheel and the load 9 is lifted evenly. Serious accidents and breakages of slings as well as castings attributable to unexpected tipping of the load are thereby avoided. When the load is placed down and tension on the rope 12 is relieved, the springs 27 return the pulley wheel 13 to the normal position and the shoes 31 and 32 release the rope.

In the second form of my invention shown in Figs. 4, 5, and 6, there is a single brake shoe 40 of arcuate form mounted in the lower portion of the frame 18 on through-bolts 41, which extend freely through holes 42 provided in the shoe. The shoe may, however, be a rigid or even integral part of the frame 18. The side faces 43 of the shoe are inclined parallel to the side walls 37 of the groove 35 in the pulley wheel 13, and the shoe is wide enough between these inclined side faces to have wedging engagement in the pulley wheel groove sufficient to hold the wheel against turning when the wheel moves downwardly into engagement with the shoe 40, in a manner similarly as in the operation of the other form. A wide groove 44 is provided in the inner periphery of the shoe to accommodate that portion of the rope 12 extending around the lower portion of the pulley wheel. In this case there are two passes of the rope and they accordingly necessitate a groove as wide as that shown. It will be noticed, in Fig. 6, that the groove extends helixwise with respect to the shoe in approximately the same direction as the rope extends with respect to the pulley wheel.

The operation of this sling is substantially the same as the other, the principal difference being that the shoe 40 frictionally resists turning of the pulley wheel alone and no effort is made to frictionally grip the rope. I have found that there is no danger of the rope slipping with respect to the pulley wheel when the pulley wheel is held against turning if the rope is wound around the pulley at least twice and, therefore, has a sufficient length of frictional contact with the pulley. However, if desired, the pulley groove may be serrated, ridged, knurled or otherwise formed to frictionally, or otherwise, resist slippage of the rope thereon.

In a third form, illustrated in Figs. 7 and 8, the pulley wheel groove 35a is notched out at evenly circumferentially spaced points, as indicated at 45, to receive the links of a load supporting chain 12a, without slippage. The chain merely passes over the upper half of the wheel 13a and is attached at its ends to the load. A brake shoe 40a formed as an integral part of a spacer 46 between the face plates 17a of the frame 18a serves by engagement in the groove 35a, when the wheel is forced down under load against the resistance of the springs 27, to hold the wheel against turning, similarly as in the construction of Figs. 4–6, and inasmuch as the chain cannot slip with respect to the wheel the load is lifted level, even though the legs formed by the opposite end portions of the chain may not be of the same length.

In view of the foregoing, it should be clear that wherever in the claims the word "rope" is used, it should be understood as broadly including cable, chain, wire rope, wire, or any flexible load supporting element, in a continuous length, whether in one piece or length, or many lengths or links.

It is believed the foregoing description conveys a good understanding of the objects and advantages of my invention. The appended claims have been drawn to cover all legitimate modifications and adaptations.

I claim:

1. A sling of the class described, comprising a load carrying frame, a pulley wheel rotatably mounted therein, a single continuous length of rope wound around said pulley wheel and arranged to be attached at its opposite ends to the load to be lifted, and means for automatically locking the wheel against turning when the rope is put under tension by load whereby to prevent changing of sling leg lengths.

2. A sling of the class described, comprising a load carrying frame, a pulley wheel rotatably mounted therein, a single continuops length of rope wound around said pulley wheel and arranged to be attached at its opposite ends to the load to be lifted, and means for automatically holding the wheel against turning and holding the rope against slipping relative to the wheel when the rope is put under tension by the load whereby to prevent changing of sling leg lengths.

3. A sling of the class described, comprising a load carrying frame, a pulley wheel rotatably mounted therein, a single continuous length of rope wound around said pulley wheel and arranged to be attached at its opposite ends to the load to be lifted, and means for automatically frictionally resisting turning of the wheel and frictionally resisting slippage of the rope relative to the wheel when the rope is put under tension by the load whereby to prevent changing of sling leg lengths.

4. A sling of the class described, comprising a load carrying frame, a pulley wheel rotatably mounted therein and with freedom to move up and down with respect thereto, a single continuous length of rope wound around said pulley wheel and arranged to be attached at its opposite ends to the load to be lifted, spring means resisting downward movement of the wheel, said spring means being yieldable to permit downward movement of the wheel when a predetermined load is placed on the wheel through the medium of said rope, and brake shoe means on the frame arranged to be engaged by the wheel upon downward movement thereof to resist turning thereof.

5. A sling of the class described, comprising a load carrying frame, a pulley wheel rotatably mounted therein and with freedom to move up and down with respect thereto, a single continuous length of rope wound around said pulley wheel and arranged to be attached at its opposite ends to the load to be lifted, spring means resisting downward movement of the wheel, said spring means being yieldable to permit downward movement of the wheel when a predetermined load is placed on the wheel through the medium of said rope, and brake shoe means on the frame arranged to be engaged by the wheel and rope upon downward movement thereof to resist turning of the wheel and also resist slippage of the rope relative to the wheel.

6. A sling of the class described, comprising a load carrying frame, a pulley wheel rotatably mounted therein and with freedom to move up and down with respect thereto, a single continuous length of rope wound around said pulley wheel and arranged to be attached at its opposite ends to the load to be lifted, spring means resisting downward movement of the wheel, said spring means being yieldable to permit downward movement of the wheel when a predetermined load is placed on the wheel through the medium of said rope, and a pair of brake shoes mounted in said frame for movement toward and away from one another arranged to grip a portion of the rope on the wheel therebetween, and further arranged to be engaged by the wheel in the downward movement thereof and to be moved toward one another by such engagement, said shoes being adapted to frictionally resist turning of the wheel and frictionally resist slippage of the hope relative to the wheel.

7. A sling of the class described, comprising a load carrying frame, a pulley wheel rotatably mounted therein and with freedom to move up and down with respect thereto, a single continuous length of rope wound around said pulley wheel and arranged to be attached at its opposite ends to the load to be lifted, spring means resisting downward movement of the wheel, said spring means being yeildable to permit downward movement of the wheel when a predetermined load is placed on the wheel through the medium of said rope, and a single brake shoe mounted in said frame arranged to be engaged by the peripheral portion of the wheel upon downward movement thereof to frictionally resist turning of the wheel, said shoe having a groove provided therein to accommodate that portion of the rope extending around the pulley on the side toward the shoe.

8. A sling of the class described, comprising a load carrying frame, a pulley wheel rotatably mounted therein and with freedom to move up and down with respect thereto, a single continuous length of rope wound around said pulley wheel at least two turns and arranged to be attached at its opposite ends to the load to be lifted, spring means resisting downward movement of the wheel, said spring means being yieldable to permit downward movement of the wheel when a predetermined load is placed on the wheel through the medium of said rope, and a single arcuate brake shoe mounted in said frame arranged to be engaged by the peripheral portion of the wheel upon downward movement thereof to frictionally resist turning of the wheel, said shoe having a groove provided therein to accommodate that portion of the rope extending around the pulley on the side toward the shoe, said groove being wide enough to accommodate freely the lower passes of the rope side by side on the wheel, the said groove extending helixwise relative to the shoe in the same direction as the rope extends with respect to the wheel.

9. A sling of the class described, comprising a load carrying frame, a pulley wheel rotatable therein and also movable up and down with respect thereto, a single continuous length of rope for attachment to the load haivng an intermediate portion of the length thereof wound around the pulley wheel, an axle for rotatably supporting the wheel, coiled compression springs upon which the ends of said axle are resiliently supported for up and down movement relative to the frame, whereby said springs resist downward movement of said wheel but are yieldable to permit downward movement of the wheel when a predetermined load is imposed thereon through the medium of said rope, and means for automatically locking the wheel against turning when it has moved downward a predetermined distance.

10. A sling of the class described, comprising a load carrying frame, a pulley wheel rotatable therein and also movable up and down with respect thereto, a single continuous length of rope for attachment to the load having an intermediate portion of the length thereof wound around the pulley wheel, an axle for rotatably supporting the wheel, coiled compression springs upon which the ends of said axle are resiliently supported for up and down movement relative to the frame, whereby said springs resist downward movement of said wheel but are yieldable to permit downward movement of the wheel when a predetermined load is imposed thereon through the medium of said rope, and means for locking the wheel against turning and holding the rope against slipping relative to the wheel when the wheel has moved downward a predetermined distance relative to the frame.

11. A sling of the class described, comprising a load carrying frame, a pulley wheel rotatable therein and also movable up and down with respect thereto, a single continuous length of rope for attachment to the load having an intermediate portion of the length thereof wound around the pulley wheel, an axle for rotatably supporting the wheel, coiled compression springs upon which the ends of said axle are resiliently supported for up and down movement relative to the frame, whereby said springs resist downward movement of said wheel but are yieldable to permit downward movement of the wheel when a predetermined load is imposed thereon through the medium of said rope, and a brake shoe on said frame arranged to be engaged by the wheel when the same has moved downward a predetermined distance whereby to frictionally resist turning of the wheel.

12. A sling of the class described, comprising a load carrying frame, a pulley wheel rotatable therein and also movable up and down with respect thereto, a single continuous length of rope for attachment to the load having an intermediate portion of the length thereof wound around the pulley wheel, an axle for rotatably supporting the wheel, coiled compression springs upon which the ends of said axle are resiliently supported for up and down movement relative to the frame, whereby said springs resist downward movement of said wheel but are yieldable to permit downward movement of the wheel when a predetermined load is imposed thereon through the medium of said rope, and a brake shoe on said frame arranged to be engaged by the wheel when the same has moved downward a predetermined distance whereby to frictionally resist turning of the wheel, said shoe being of arcuate form and conforming to the periphery of the wheel and having a longitudinally extending groove on the inner periphery thereof freely receiving the rope on the wheel.

13. A sling of the class described, comprising a load carrying frame, a pulley wheel rotatable therein and also movable up and down with respect thereto, a single continuous length of rope for attachment to the load having an intermediate portion of the length thereof wound around the pulley wheel, an axle for rotatably supporting the wheel, coiled compression springs upon which the ends of said axle are resiliently supported for up and down movement relative to the frame, whereby said springs resist downward movement of said wheel but are yieldable to permit downward movement of the wheel when a predetermined load is imposed thereon through the medium of said rope, and a brake shoe on said frame arranged to be engaged by the wheel when the same has moved downward a predetermined distance whereby to frictionally resist turning of the wheel, said shoe being movable laterally upon engagement with the wheel and being arranged to have frictional engagement with the rope to resist slippage of the rope with respect to the wheel.

14. A sling of the class described, comprising a load carrying frame, a pulley wheel rotatable therein and also movable up and down with respect thereto, a single continuous length of rope for attachment to the load having an intermediate portion of the length thereof wound around the pulley wheel, an axle for rotatably supporting the wheel, coiled compression springs upon which the ends of said axle are resiliently supported for up and down movement relative to the frame, whereby said springs resist downward movement of said wheel but are yieldable to permit downward movement of the wheel when a predetermined load is imposed thereon through the medium of said rope, and a pair of brake shoes mounted on said frame on opposite sides of the rope wound around the pulley and arranged to be engaged by the pulley upon downward movement thereof a predetermined distance to frictionally resist turning of said wheel, said wheel being so formed in relation to the shoes to cam the shoes toward one another upon engagement of the wheel with the shoes, and said shoes being arranged to have frictional engagement with the rope when moved together to resist slippage of the rope relative to the wheel.

15. A sling of the class described, comprising a load-carrying frame, a pulley wheel rotatably mounted therein, a single continuous length of flexible load-carrying element extending over said pulley and arranged to be attached at its opposite ends to the load to be lifted, and means for automatically locking the wheel against turning when the load-carrying element is put under tension by load, whereby to prevent changing of sling leg lengths.

16. A sling of the class described, comprising a load-carrying frame, a pulley wheel rotatably mounted therein, a single continuous length of flexible load-carrying element extending over said pulley and arranged to be attached at its opposite ends to the load to be lifted, and means for holding the flexible element against slippage relative to the wheel and for automatically holding the wheel against turning when the flexible element is put under tension by the load whereby to prevent changing of sling leg lengths.

17. A sling of the class described, comprising a load-carrying frame, a pulley wheel rotatably mounted therein, a single continuous length of flexible load-carrying element extending over said pulley and arranged to be attached at its opposite ends to the load to be lifted, spring means resisting downward movement of the wheel, said spring means being yieldable to permit downward movement of the wheel when a predetermined load is placed on the wheel through the medium of said flexible element, and brake shoe means on the frame arranged to be engaged by the wheel upon downward movement thereof to resist turning thereof.

18. A sling of the class described, comprising a load-carrying frame, a pulley wheel rotatably mounted therein, a single continuous length of flexible load-carrying element extending over said pulley and arranged to be attached at its opposite ends to the load to be lifted, spring means resisting downward movement of the wheel, said spring means being yieldable to permit downward movement of the wheel when a predetermined load is placed on the wheel through the medium of said flexible element, and brake shoe means on the frame arranged to be engaged by the wheel upon downward movement thereof to resist turning thereof, the flexible element being also held against slippage relative to the wheel.

19. A sling of the class described, comprising a load carrying frame, a pulley wheel rotatably mounted therein, a single continuous length of chain passing over said pulley wheel and arranged to be attached at its opposite ends to the load to be lifted, said chain having non-slipping engagement on said pulley, and means for automatically locking the wheel against turning when the chain is put under tension by load whereby to prevent changing of sling leg lengths.

20. A sling of the class described, comprising a load carrying frame, a pulley wheel rotatably mounted therein, a single continuous length of chain passing over said pulley wheel and arranged to be attached at its opposite ends to the load to be lifted, said chain having non-slipping engagement on said pulley, and braking means for frictionally resisting turning of the wheel when the chain is put under tension by load whereby to prevent changing of sling leg lengths.

21. A sling of the class described, comprising a load carrying frame, a pulley wheel rotatably mounted therein and with freedom to move up and down with respect thereto, a single continuous length of chain passing over said pulley wheel and arranged to be attached at its opposite ends to the load to be lifted, said chain having non-slipping engagement on said pulley, spring means resisting downward movement of the wheel, said spring means being yieldable to permit downward movement of the wheel when a predetermined load is placed on the wheel through the medium of said chain, and brake shoe means on the frame arranged to be engaged by the wheel upon downward movement thereof to resist turning thereof.

LESLIE M. CALDWELL.